P. F. Lamshe,

Coffin.

Nº 77,627. Patented May 5, 1868.

Witnesses:
P. T. Dodger
L. Hailer.

Inventor:
P. F. Lamshe
by Dodge & Munn
his attys.

United States Patent Office.

PETER F. LAWSHE, OF ROCHESTER, MINNESOTA.

Letters Patent No. 77,627, dated May 5, 1868.

IMPROVED SELF-SEALING BURIAL-CASE.

The Schedule referred to in these Letters Patent and making part of the same.

TO ALL WHOM IT MAY CONCERN:

Be it known that I, PETER F. LAWSHE, of Rochester, in the county of Olmstead, and State of Minnesota, have invented certain new and useful Improvements in Metallic Burial-Cases; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in metallic burial-cases, whereby they are rendered more perfect and convenient for use, as hereinafter explained.

In constructing metallic burial-cases, as heretofore used, it has been the custom to pack them or render them air-tight by means of cement, of one kind or another, and frequently it is desirable, in the removal of bodies, to open and close the case, where no cement or other suitable material is at hand to close it air-tight, especially in the removal of bodies from battle-fields and similar places.

My improvement consists in so constructing the case, and providing it with packing, that it may be used anywhere, at any time, and be rendered self-sealing by the simple act of closing it.

Figure 1:
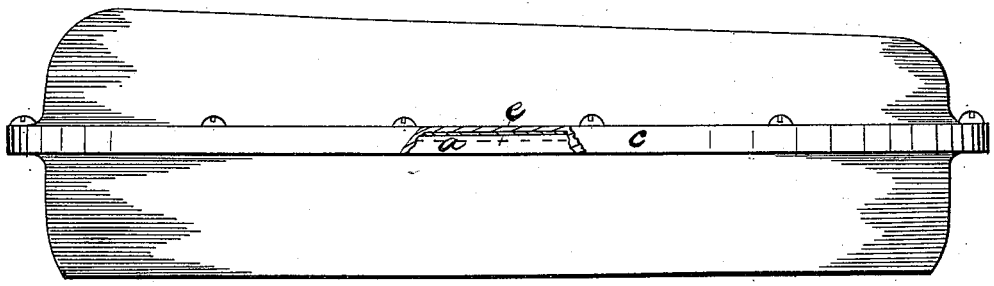
Figure 1 is a side elevation, with a portion broken away to exhibit the packing.
Figure 2:
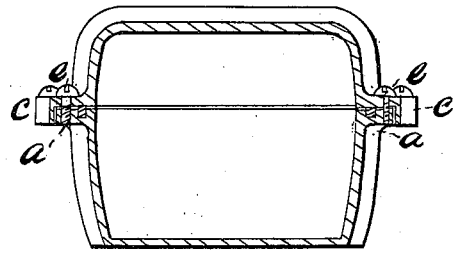
Figure 2 is a transverse section.

I construct my improved case in two parts, an upper and a lower one, as usual. The lower part I provide with a laterally-projecting flange, a, in the upper face of which I form a channel or groove, as represented in fig. 2, and in this groove I fit snugly a strip of rubber, as represented by e. Care should be taken to have this rubber strip continuous, which may be done by forming it in one continuous piece, like a ring, or by uniting and cementing its ends when cut of the proper length to fit the groove. It may be inserted snugly in the groove without cementing it therein; but I prefer to secure it therein by means of rubber cement.

The upper part of the case I construct with a flange, which also projects radially, and has a lip at its outer edge to shut down over the edge of the flange of the other part, as shown in fig. 2.

It will thus be seen that when the two parts are placed together, as represented in the drawing, the rubber will form a packing for the joint that will render the case self-sealing, and that when thus made, the case can be used in any place and at any time without the use of any cement specially provided for the purpose; and further, that it can be opened and closed as often as required without affecting the packing, or the necessity of providing cement for sealing it again when once opened. All that is required is simply to screw the cover down tight, and it is sealed or rendered air-tight by that simple operation.

It is obvious that, instead of making the groove for the rubber in one flange only, it may be made partly in each, or that it may be dispensed with entirely, and the rubber simply placed between the two flanges; but I prefer, in any case, to set the rubber on edge, as it is more certain to pack and seal the joint perfectly.

Having thus described my invention, what I claim is—

1. A self-sealing burial-case, constructed and arranged to operate substantially as described.

2. A metallic burial-case, constructed substantially as herein described, and provided with the rubber packing, as and for the purpose set forth.

PETER F. LAWSHE.

Witnesses:
CHAS. M. BOWES,
JOHN J. COOKE.